(12) United States Patent
Coupe

(10) Patent No.: US 8,612,664 B2
(45) Date of Patent: Dec. 17, 2013

(54) MEMORY MANAGEMENT PROCESS AND APPARATUS FOR THE SAME

(75) Inventor: David Coupe, Vallauris (FR)

(73) Assignee: ST-Ericsson SA, Plan-les-Ouates (CH)

( * ) Notice: Subject to any disclaimer, the term of this patent is extended or adjusted under 35 U.S.C. 154(b) by 209 days.

(21) Appl. No.: 13/142,590

(22) PCT Filed: Dec. 29, 2009

(86) PCT No.: PCT/EP2009/009310
§ 371 (c)(1),
(2), (4) Date: Aug. 26, 2011

(87) PCT Pub. No.: WO2010/076020
PCT Pub. Date: Jul. 8, 2010

(65) Prior Publication Data
US 2011/0307643 A1    Dec. 15, 2011

(30) Foreign Application Priority Data
Dec. 31, 2008  (EP) .................................. 08368022

(51) Int. Cl.
G06F 12/00 (2006.01)
G06F 13/00 (2006.01)

(52) U.S. Cl.
USPC ................ 711/5; 711/100; 711/127; 711/154

(58) Field of Classification Search
USPC ..................................... 711/5, 100, 127, 154
See application file for complete search history.

(56) References Cited

U.S. PATENT DOCUMENTS

| | | | |
|---|---|---|---|
| 5,701,270 A * | 12/1997 | Mohan Rao | ............. 365/230.03 |
| 6,412,032 B1 | 6/2002 | Neet et al. | |
| 6,549,442 B1 * | 4/2003 | Lu et al. | ........................ 365/49.1 |
| 7,539,843 B2 * | 5/2009 | Kruger et al. | .................. 711/207 |
| 8,335,908 B2 * | 12/2012 | Waugh | ........................... 711/207 |
| 2006/0004983 A1 | 1/2006 | Tsao et al. | |

OTHER PUBLICATIONS

International Search Report for PCT/EP2009/009310 mailed Mar. 25, 2010.
Written Opinion for PCT/EP2009/009310 mailed Mar. 25, 2010.
Stevens, R., "Unix Network Programming, Interprocesses Communications, Multiple Buffers," UNIX Network Programming, Interprocesses Communications, vol. 2, Aug. 27, 1998, pp. 249-255, XP002499807.

* cited by examiner

*Primary Examiner* — Tuan Thai
(74) *Attorney, Agent, or Firm* — Patent Portfolio Builders PLLC

(57) ABSTRACT

Memory management process for optimizing the access to a central memory located within a processing system comprising a set of specific units communicating with each other through said memory, said process involving the steps of: a) arranging in a local memory at least a first and a second bank of storage (A, B) for the purpose of temporary object exchanged between a first data object producer (400) and a second data object consumer (410); b) arranging a address translation process for mapping the real address of an object to be stored within said banks into the address of the bank; b) receiving one object produced by said producer and dividing it into stripes of reduced size; c) storing the first stripe into said first bank; d) storing the next stripe into said second bank while the preceding stripe is read by said object consumer (410); e) storing the next stripe into said first bank again while the preceding stripe is read by said object consumer (410). f) repeating e) and c) until all stripes composing said data objects have been processed; g) arranging an interlocking mechanism for locking the writing and reading process in said banks to ensure producer has enough space to forward further data, as well as receiver has indeed data to read.

8 Claims, 10 Drawing Sheets

MEMORY MANAGEMENT PROCESS AND APPARATUS FOR THE SAME

TECHNICAL FIELD

The present invention relates to memory management mechanisms and more particular to a technique for optimizing the access to a central memory located within a processing system comprising a set of specific units communicating with each other through said memory

BACKGROUND ART

Graphic and video rendering is quite challenging in the mobile phone environment. More and more mobile phones get new capabilities where deeper colour scheme are used as well as video objects can be displayed. Beside the construction of objects to display, another challenge is to simply combine and display them in the most efficient way.

The sources combination and display of graphical and video objects is facing the same constraints as any function in a mobile phone, that is:

Power consumption
Memory footprint
Memory bandwidth

The objects to combine are graphical or video objects, which can be viewed as frame or sub-frame. More generally, they can be assimilated to a 2-dimension continuous array containing pixels information. The physical arrangement of pixel information will be ruled by several characteristics:

Colour Space:

YUV/YCbCr: Luminance and Chrominance information are separated with specific sampling rate RGB: Three primary colour system used for display Colour Depth:

Each colour component is coded with a variable length bits field ending in specific data arrangement, which must match memory granularity: byte (8 bits), half-word (16 bits), word (32 bits). Examples of such arrangement for RGB colour space are: RGB332, RGB444, RGB565, RGB666 and RGB888 where each number of triple sequence indicates the number of bits associated to each colour channel, Red Green and Blue respectively.

Chrominance Sampling:

Especially valid for the YUV/YCbCr colour space since the Chrominance information represented by the U/Cb and V/Cr channels can have a different sampling rate from the Luminance information represented by the Y channel. Examples of sampling configuration are: 4:4:4 (each pixel has a Luminance and Chrominance information), 4:2:2 (each horizontal pair of pixels is sharing the chrominance information), 4:2:0 (each quadruple formed by horizontal pair of pixels on two adjacent lines are sharing the chrominance information) and 4:1:1 (each horizontal quadruple of pixels is sharing the chrominance information)

Memory Alignment Constraint:

Despite we can have arbitrary length for a bit field, computer and more generally a processing unit is accessing memory through a fixed granularity. The information length turns into a power of 2 multiple of a byte length. Example: byte (1), half-word (2), word (4), quad-word (8) and so forth.

Finally, it is nearly impossible to describe exhaustively all possible representation of colour information of graphical or video objects. Albeit, they all share the same framework: It can be represented by a 2D array of pixel colour information.

The combination of graphic or video objects can be described as the geometric operation and information conversion applied to a series of objects in order to merge them into a new graphic or video object. Example of such a process can be the following:

A picture is captured from a camera sensor at a specific frame rate, predefined resolution and using a 4:2:0 YUV colour representation. A window of interest inside this picture can be selected, will be decimated (shrunk) and colour converted into RGB565 colour representation; the scaled size may actually match the final display screen size.

A processing unit builds a frame using an RGB565 colour representation. The resulting constructed frame is scaled and colour converted to a size/colour depth, which may match the display screen size.

Another processing unit is building a frame through a compressed video decoding task. The resulting decoding is scaled and colour converted to a size/colour depth, which may match the display screen size.

All the former objects can be stacked in an arbitrary order, and each layer can be associated with a specific transparency value ranging from 0% (opaque) to 100% (transparent).

The final construction is sent to a display unit, which will get it visible, in common sense.

Combination of objects can be quite complex, and not only because of heterogeneous colour space/resolution representations. The various objects can be produced at different time bases making their respective representation not available at identical instant. These constraints force the usage of temporary buffers to hold representation of objects in order to combine them at appropriate time.

Going further in the combination process, one can have intermediate steps of combination. Supposing as example we have N objects to combine, the N objects set can be partitioned in groups of objects—let say I, J and K whose sums equal N—each partition can be combined and their respective results further combined in a final combination process. We can immediately see such a hierarchical combination is creating intermediate objects representation, which will written and read by the final combination process. This hierarchical combination process has some advantages on one hand since producing simpler tasks to execute. On the other hand intermediate objects representation has a drawback; it will consume memory to hold the information and will require memory bandwidth to store and retrieve data. This is something, which can create a strong penalty when designing products applied to mobile market where power, memory size and memory bandwidth are scarce resources.

While the hierarchical combination of graphic or video objects simplifies a complex combination process by dividing it in simpler operations, it nevertheless results in potential bottlenecks around the memory resources. FIG. 1 illustrates the example of the rendering process of mobile phone used for a camera preview process. A sensor 110 is providing image to an Image processing block 120 which is then processed by a Graphic processor 140 for the purpose of generating image frames which are forwarded to an Display Engine 160 which are to be displayed on a Display 170. The architecture is based on a centralized memory 100 and a central processor 130 and all blocks communicate to each other via that same memory. The advantage of this known architecture results from its great flexibility since each processing unit within the display pipeline may have its own frame rate. The clear drawback comes from the fact that such architecture becomes prohibitive as the size of the memory increases to host all intermediate data structures. In addition, the bandwidth of the memory is significantly increased since any process is requesting access to that memory, such as, for instance, the exchanges between Graphic processor 140 and Display engine 160 which request access to the memory through requests illustrated by reference 150 in the figure.

In order to solve the issue created by the intermediate production of a hierarchical combination, an immediate approach to improve the situation and reduces the access to memory 100 is to try to create a direct path between different units, hereinafter referred to as producers and consumers of objects, in the combination chain. This is the aim of the streaming technique which is shown in FIG. 2. Sensors 110, memory 100, processor 130 and display 170 remain unchanged and keep their reference numbers. The streaming architecture is based on a synchronous pipeline comprising an image processing unit 220, a graphic process 240 and a display engine 260 which communicate via a direct communication link, as shown by arrow 250, which does not use the central memory 100, since all units 220, 240 and 260 do include their own minimum internal storage.

This streaming architecture has the advantage of reducing the size of the external memory and also achieves fastest and deterministic processing chain.

However, the clear drawbacks results from the synchronous pipeline which prohibits the use of such architecture in some situations, and further does not allow any access to intermediate data.

FIG. 3 illustrates a halfway solution showing the considered example of the camera preview process between a sensor 310, an image processing unit 320, a first local memory 351 (located within unit 320 for instance), a graphic processor 340, a second local memory 352 (located within unit 320 or 330 for instance), a display engine 360 and a display 370.

Unfortunately, this approach is not always possible because objects size to hold for intermediate combination processing. As example a QVGA (320×240) frame of RGB565 colour depth will require about 150 Kbytes of data in a local memory. This amount of memory will become 600 Kbytes when considering is VGA (640×380) resolution for the same colour depth. Such a buffer size can be viewed as quite modest when compared to standard Personal Computer memory configuration; nevertheless this translates into large area which will grow Integrated Circuits size and will make them uncompetitive for a mass market like mobile phone Integrated devices.

Finally, an added constraint comes from the Software structure, which will control the combination process. Despite the first block diagram representation is likely the worst solution to implement, it is the one that Software developers will like the most since it offers maximum flexibility. This is the concept of unified memory where any section of memory is viewed in a continuous address space. The software programmer creates full size object placeholders in memory and allocate them to producer and consumer agents the way he wants regardless of the memory congestion it can potentially creates.

The technical problem to solve is to create a mechanism, which will offer the maximum software flexibility while maintaining the local and external memory size and bandwidth to the bare minimum at equivalent functionality.

SUMMARY OF THE INVENTION

It is an object of the present invention to map a full frame buffer size in a fraction of its actual representation and make it transparent to the SW which will use it.

These and other objects of the present invention are achieved by means of the Memory management process for optimizing the access to a central memory located within a processing system comprising a set of specific units communicating with each other through said memory, said process involving the steps of:

a) arranging in a local memory at least a first and a second bank of storage (A, B) for the purpose of temporary object exchanged between a first data object producer and a second data object consumer;

b) arranging a address translation process for mapping the real address of an object to be stored within said banks into the address of the bank;

b) receiving one object produced by said producer and dividing it into stripes of reduced size;

c) storing the first stripe into said first bank;

d) storing the next stripe into said second bank while the preceding stripe is read by said object consumer (410);

e) storing the next stripe into said first bank again while the preceding stripe is read by said object consumer (410).

f) repeating e) and c) until all stripes composing said data objects have been processed;

g) arranging an interlocking mechanism for locking the writing and reading process in said banks to ensure producer has enough space to forward further data, as well as receiver has indeed data to read.

In one embodiment, the process is based on the use of a bus matrix structure arranged, on one side, between said producer and said consumer and, on the other side, between said at least first and second bank. The bus matrix structure is arranged for performing an address translation process being transparent to any processing unit.

In one embodiment, there is provided one monitoring circuit being associated with each of said bank and a control unit for the purpose of monitoring the address, the type of command and the identification of the producer/consumer and issuing interrupt to a control unit or a sequencing machine independent to said central processor.

There is thus achieved a "striping" process of the data object to be exchanged between one producer and one consumer—or receiver—which striping allows to significant reduce the amount of storage to be arranged outside the central memory, which striping process does not causes the generation of multiple interrupts signals for the central process.

The writing of the application software is greatly facilitated for the software designer.

The invention also provides with an optimized system including a central processor, central memory storage, and a set of specific units communicating with each other through said memory. The system further includes:

a) a local memory comprising at least a first and a second bank of storage (A, B) for the purpose of temporary object exchanged between a first unit considered as a first data object producer and a second unit considered as a second data object consumer;

b) a bus matrix structure arranged for achieving access from said producer/consumer and said at least first and second banks, said bus matrix structure performing an address translation process for mapping the real address of an object to be stored within said banks into the address of the bank;

c) monitoring circuits associated to each of said first and second bank of storage for monitoring the address, the type of command and the identifier of the units accessing to said associated bank; said monitoring circuits issuing interrupts to a control unit independent from said central processor;

d) said bus matrix structure being further arranged for receiving one object produced by said producer and dividing it into stripes of reduced size and for alternatively performing a writing operation in said at least first bank while the other second bank is being read under the control of said control unit handling said interrupts generated by said monitoring circuits.

In one embodiment, the process is applied to a graphic processor and a display engine, particularly for a mobile telephone.

DESCRIPTION OF THE DRAWINGS

Other features of one or more embodiments of the invention will best be understood by reference to the following detailed description when read in conjunction with the accompanying drawings.

DESCRIPTION OF THE PREFERRED EMBODIMENTS

There will now be described how to use internal local memory which can be integrated within specific units, such as a graphic processor or a display engine, for handling data objects, such as video objects for instance, without requiring the use of large internal storage within those specific units.

The solution described here is referred as "Stripe rendering in full size virtual buffer" and is based on the fact than a hierarchical combination of objects produces intermediate objects, which do not necessarily require a full size representation at a specific time. The actual requirement is the intermediate object buffers must match a synchronization delay between the producer and consumer of this objects.

The internal representation of the object takes into consideration that part of the object is being created by the graphic process, for instance (herein after referred to as the "producer" of the data object), while part of the object is being used by the display engine (herein after called the "consumer" or the "receiver").

The invention uses a special process for distributing the object within two separate buffers—or banks—of small size, significantly lower than the size of the object, and for controlling an interleaving writing/reading process of the two banks.

Since the bank has a reduced size, the internal memory which is to be included within the specific units still remain low.

A special address translation mechanism is used for ascertaining that neither the "producer" nor the "consumer" will have to take into account the real address used for storing the object within the two associated banks. While the software programmer believes a full buffer does exist.

The intermediate object representation can have two views: The one that the producer will write (fill) and the one that a consumer will read (empty). So a pair of buffers whose size match the maximum required delay between the producer and consumer will solve the issue to minimize the required memory amount while offering a quasi-direct communication channel between the two agents. The communication between producers and consumers must be a continuous flow where both agents operate nearly synchronously when considering the full object or part of it. In order to offer a continuous flow of data, the two buffers will be swapped once the last agent—either producer or consumer—has finished its job. The pair of buffers operates in a ping-pong configuration exhibiting a continuous flow of information to the outside world, but operating in a burst manner between each other.

Figure 1:
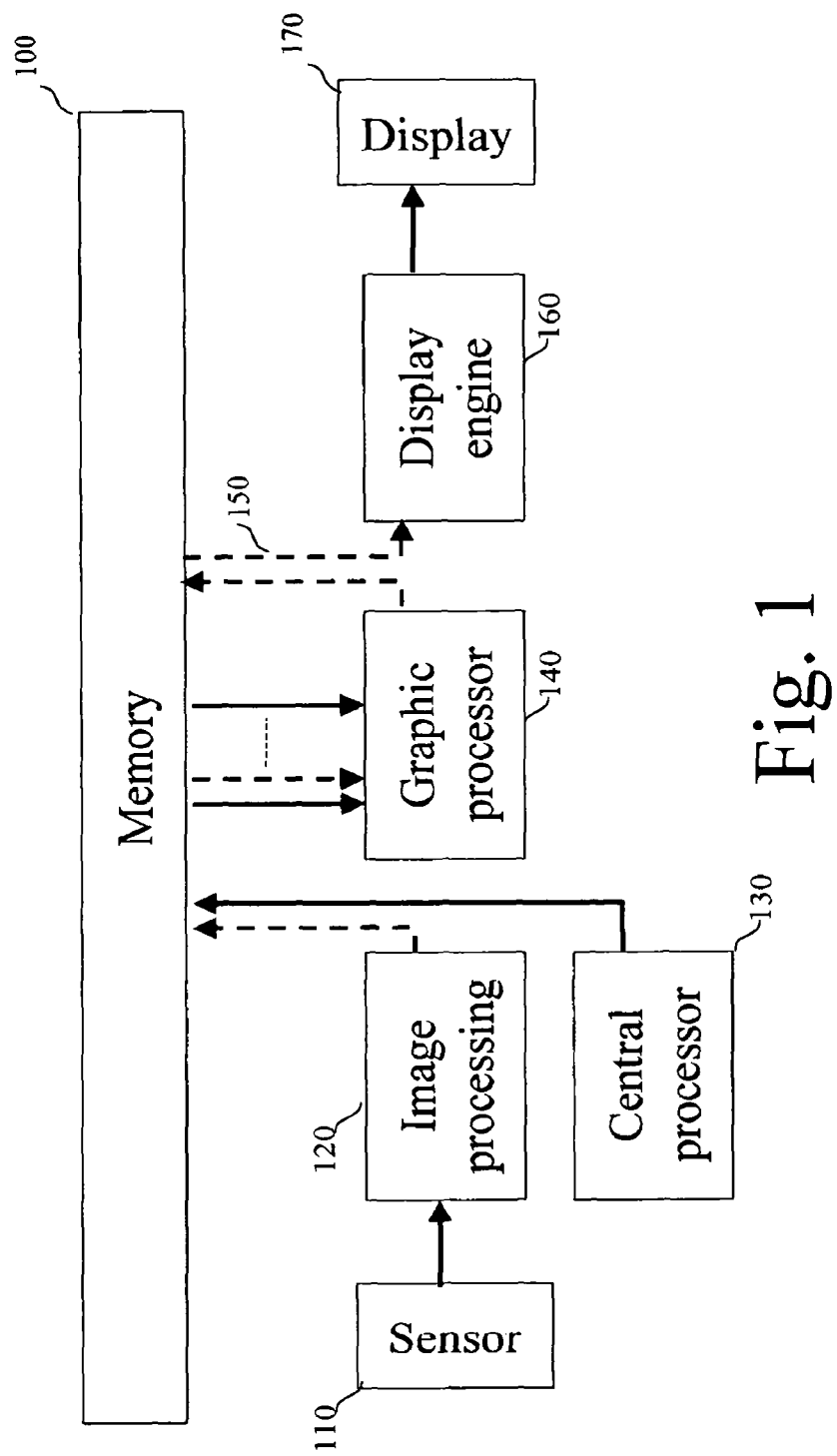
FIG. 1 illustrates a known architecture of a camera preview processing for a mobile phone.
Figure 2:
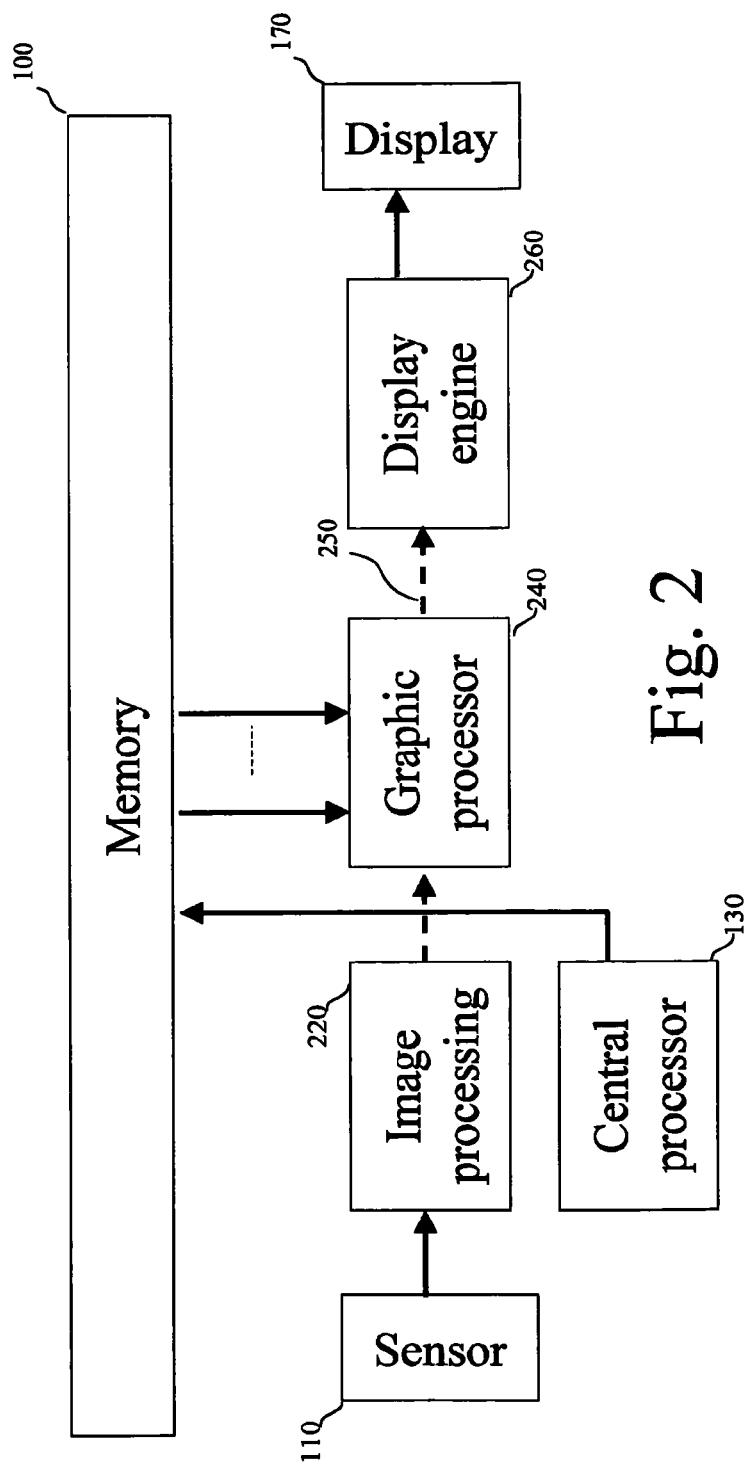
FIG. 2 illustrates a known streaming architecture for embodying a camera preview processing.
Figure 3:
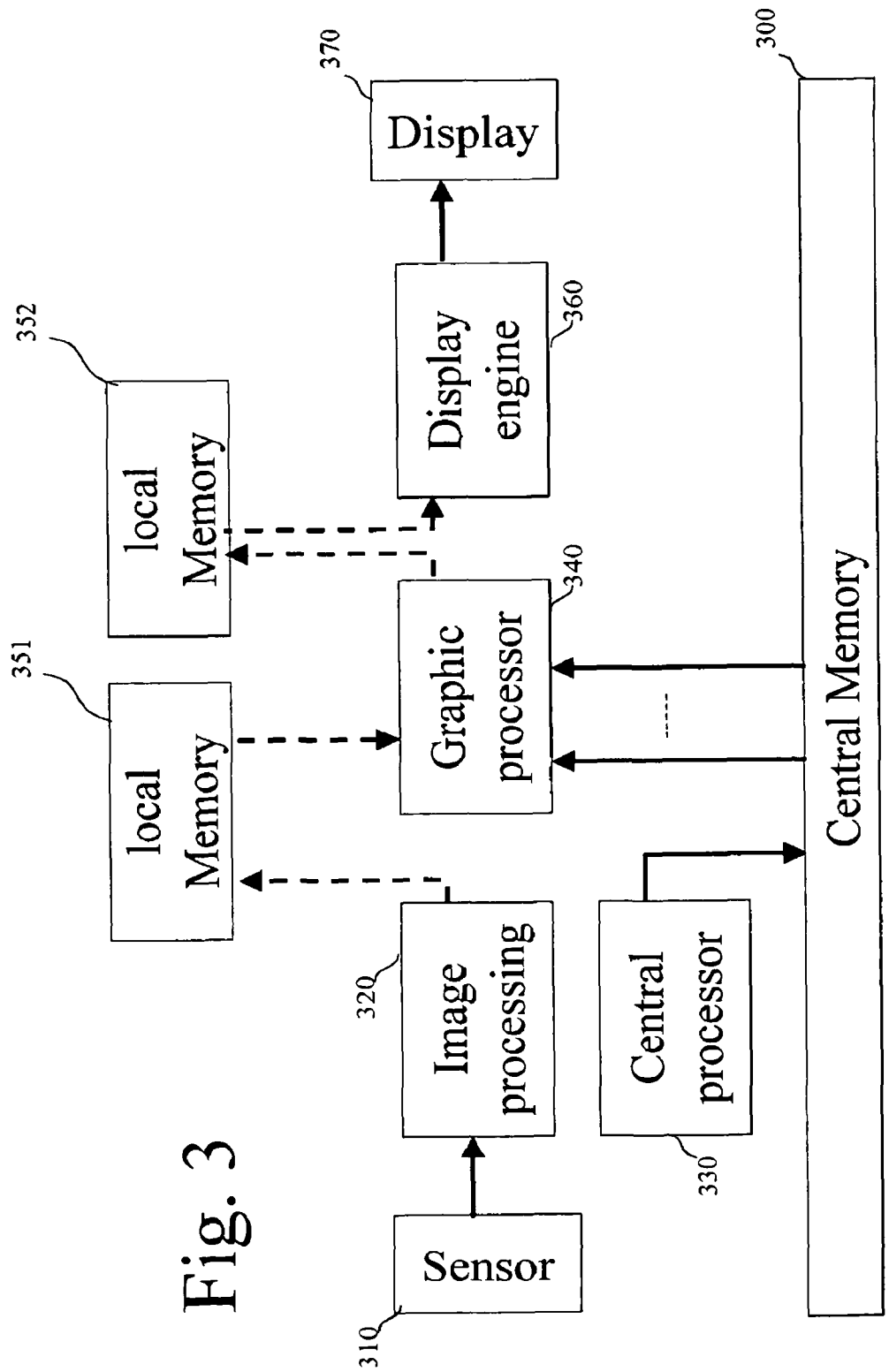
FIG. 3 shows an other known technique based on the use of local memories.
Figure 4:
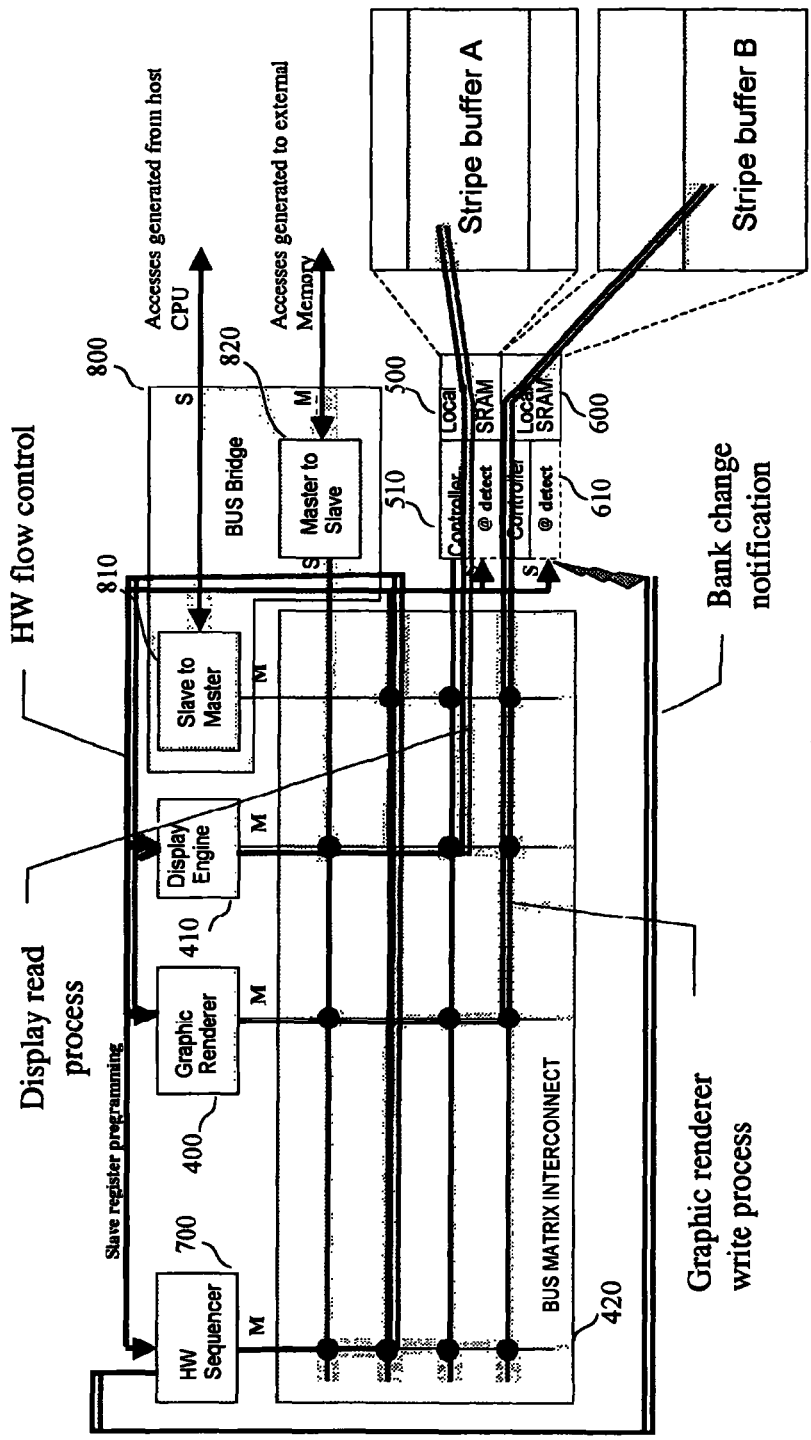
FIGS. 4 and 5 illustrate the principle of the process of the invention
Figure 5:
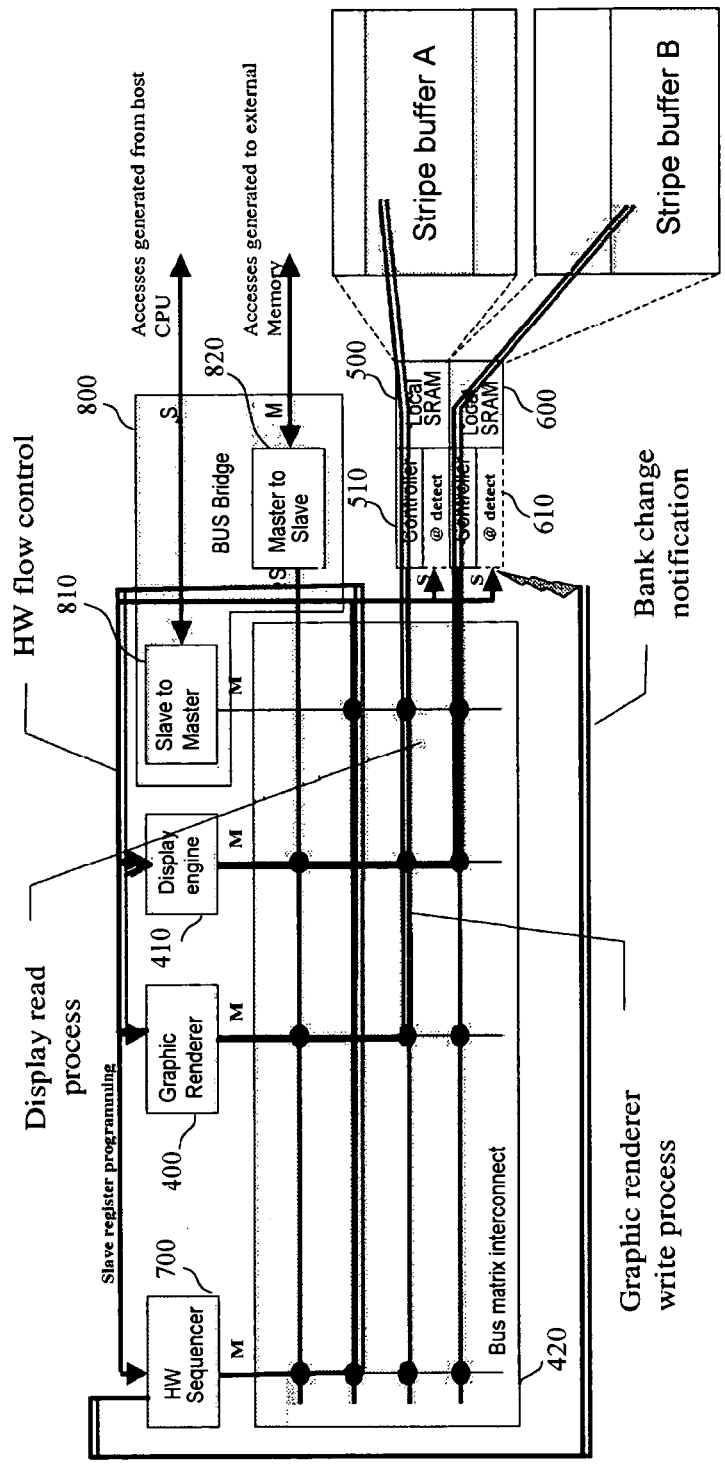

The process of buffer swapping is described in reference with FIGS. 4 and 5 showing a graphic processor or renderer 400 herein after considered as the "object producer", and a display engine 410 hereinafter designated as the "object consumer communicating through a bus matrix structure 420, through at least two local memory banks considered as "slaves", respectively at least a first memory bank A 500 and a second memory bank B 600.

First memory bank A 500 is associated with a first monitoring circuit 510 which performs monitoring of the access to that memory bank by simultaneously monitoring the address being used, the type of access (write, reading) and the identification of the master entity (graphic render or display engine) wishing to get access to memory bank 500. In response to the monitoring of the access to memory bank 500, first monitoring circuit 510 is capable of issuing an interrupt which, in accordance to the present invention, is not issued to the Central processor but to a hardware control unit or hardware sequencer 700.

Similarly, second memory bank B 600 is associated to a second monitoring circuit 610 which performs monitoring of the access to that memory bank by simultaneously monitoring the address being used, the type of access (write, reading) and the identification of the master entity (graphic render or display engine) wishing to get access to memory bank 600 and, correspondingly, to issue an interrupt which is forwarded to control unit 700.

Control Unit or hardware sequencer 700 operates as a "master" with respect to the bus matrix interconnect 420. As mentioned previously, it can receive interrupts—in particular—from first and second monitoring circuits 510 and 610. In response to such interrupts, hardware sequencer executes a sequence of operations which basically consist in write/read operations in registers for the purpose of controlling the object producer 400 and the object consumer 410 as illustrated in FIG. 5.

In addition a Bus bridge 800 is used as a communication port without the host (not illustrated) and the outside memory (not illustrated). This is achieved by two elementary Slave-to-master block 810 and Master-to-Slave 820.

As a consequence, control unit 700 is notified the different interrupts which are generated by monitoring circuits 510 and 610, and which are advantageously not forwarded to the central processor, and this is used for embodying an effective interlocking mechanism which will be described with more details in reference to FIG. 8. In one embodiment, address detectors 510 and 610 are programmable so as to achieve variable size striping.

The result of such hardware implementation will be that intermediate object combination will be implicitly "striped" by band and the storage of the object is achieved by a successive storage of the consecutive "stripe" in the two banks. Since the object is also being extracted by Display engine 410, the special mechanism is used for alternatively storing one stripe of the object within one bank while the preceding stripe is being read and forwarded to the consumer.

A special address translation mechanism is carried out by bus matrix structure 420 and consequently neither producer 400 nor consumer 410 has to consider the particular stripping process which is being performed between banks 500 and 600.

This results in the reduction of size of the memory to hold intermediate products of a hierarchical combination process as well as minimizing the required bandwidth since the communication between producers and consumers will not hit the main memory resource.

Figure 6:
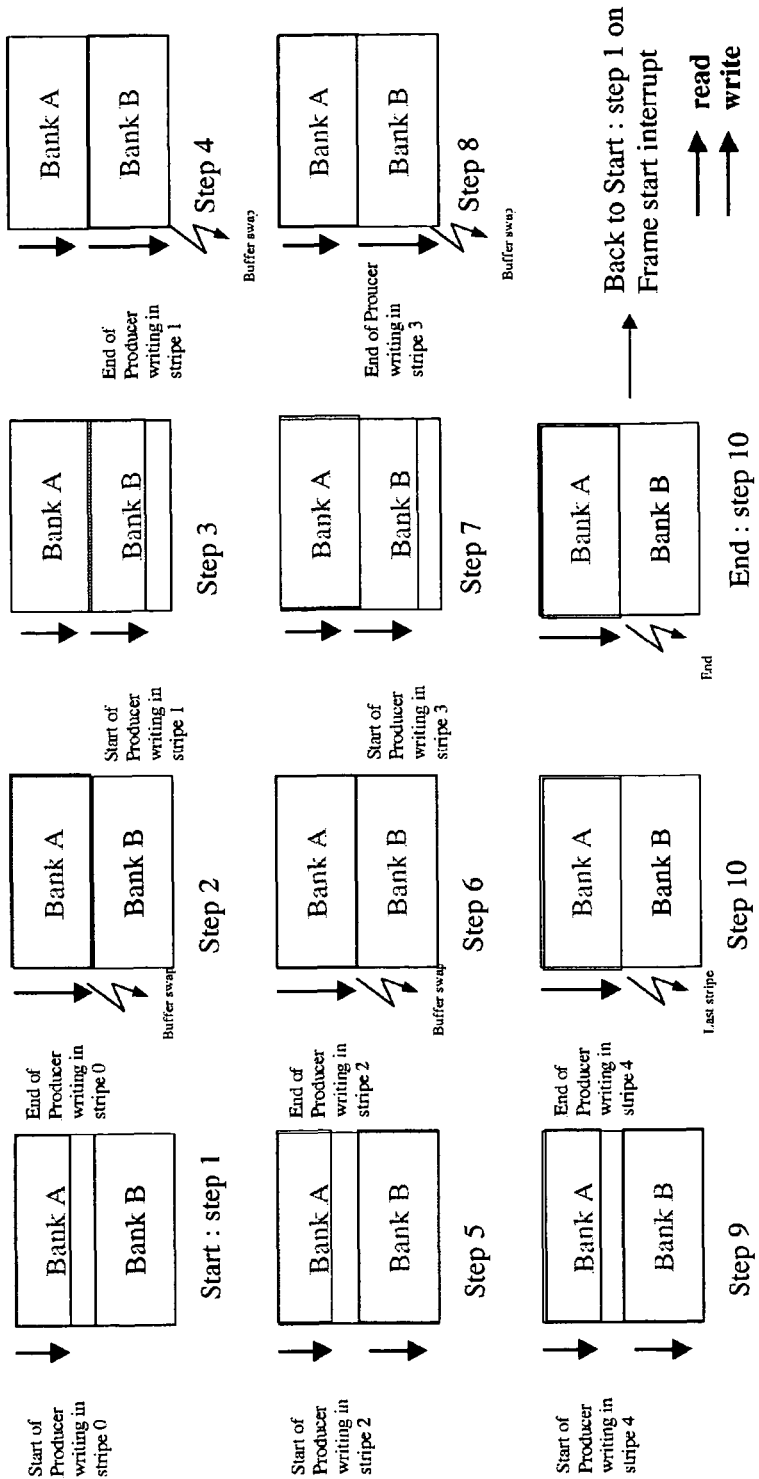
FIG. 6 illustrates the application of the process of the invention for the simultaneously writing and reading of a five stripes object.

FIG. 6 more particularly illustrates the example of buffers swap scheduling for a display requiring 5 stripes to be "displayed":

In a step 1, the producer fills the first bank 500 and the receiver is waiting.

In a step 2, the producer has finished to fill the first bank 500. This notifies the receiver that it can start the reading of the same. The producers fills the second bank while the receiver reads the first bank.

In a step 3, the producer keeps filling the second bank 600 while the receiver may have finished or not reading the first bank A.

In a step 4, the producer has finished to fill the second bank B. This notifies the receiver that it can starts reading the second bank. The producer fills the first bank while the receiver reads the second bank.

Starting steps 5 to the end (ie steps 6-10), corresponds to the reexecution of the precedings steps 1 to 4.

Figure 7:
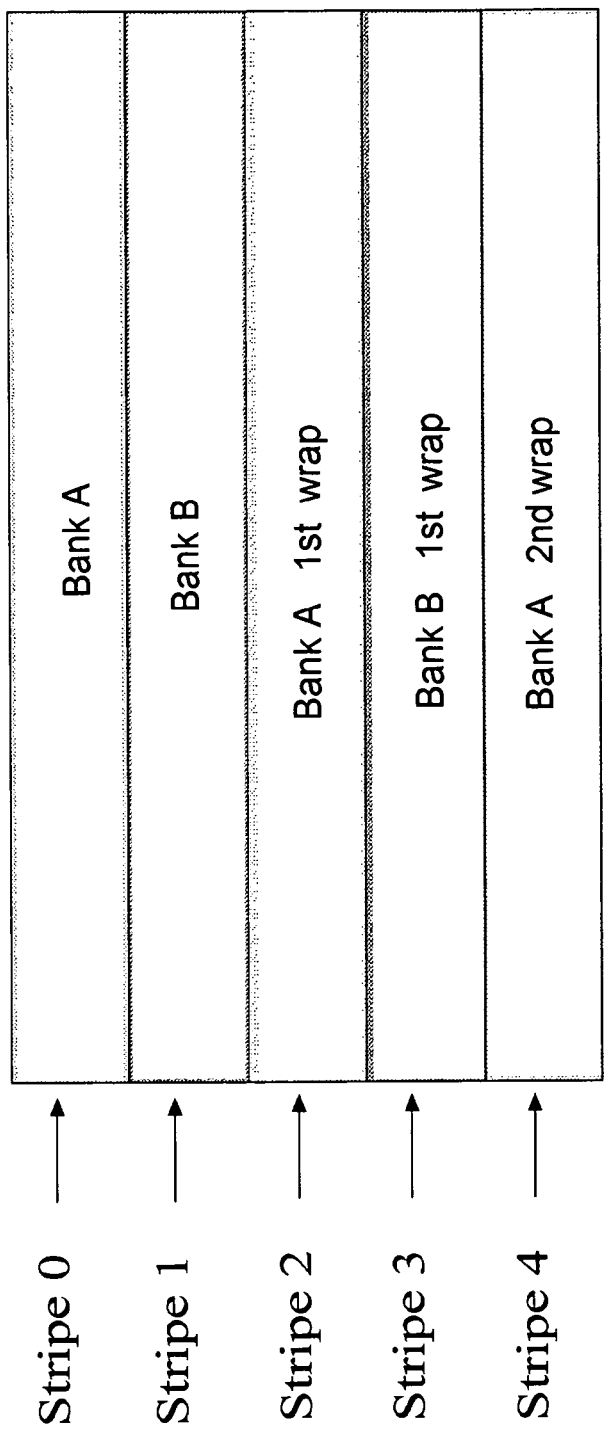
FIG. 7 illustrates the striping process between the two banks A and B.

The final display is stripped in bands and the results is illustrated in FIG. 7.

A special mechanism is used for solving the issue of software flexibility; in others words such mechanism allow the software programmer (programming the chip) to think that he is actually manipulating full size buffers while real HW implementation is only implementing a part of it. This software visibility can be achieved by an appropriate memory mapping.

The "stripe buffers" will represent a smaller size than the actual size of the intermediate object to be created. The software programmer can have the same full size object visibility in case the pair of stripe buffers (or more exactly the section used in each memory bank to form the pair of stripe buffers) are mirrored and interleaved from the shared unified memory address space standpoint. This is achieved by a memory address translation which map the shared unified memory address space onto one of the stripe buffer depending on whether we are located.

For the sake of clarity, one may consider a particular example where a 512 Kbytes area of the central memory is devoted to "stripe buffers" mapping. The 512 Kbytes memory space does actually not exist; only two banks of 32 Kbytes will be present. Sections in two banks of 32 Kbytes each are mapped in this 512 Kbytes area alternately and sequentially. They are mapped several times in such a way that walking through the main memory will implicitly access in an alternate way through the two sections of 32 Kbytes.

Such a data arrangement through address remapping has a major benefit; the producer and consumer do not have to know they are operating within stripe buffers as long as they access to memory through an address translator. It also provides an implicit buffer selection, which implements the "ping-pong" access described earlier; this process is provided implicitly as the producer and consumer walk through the address space while exchanging combined objects.

Figure 8:
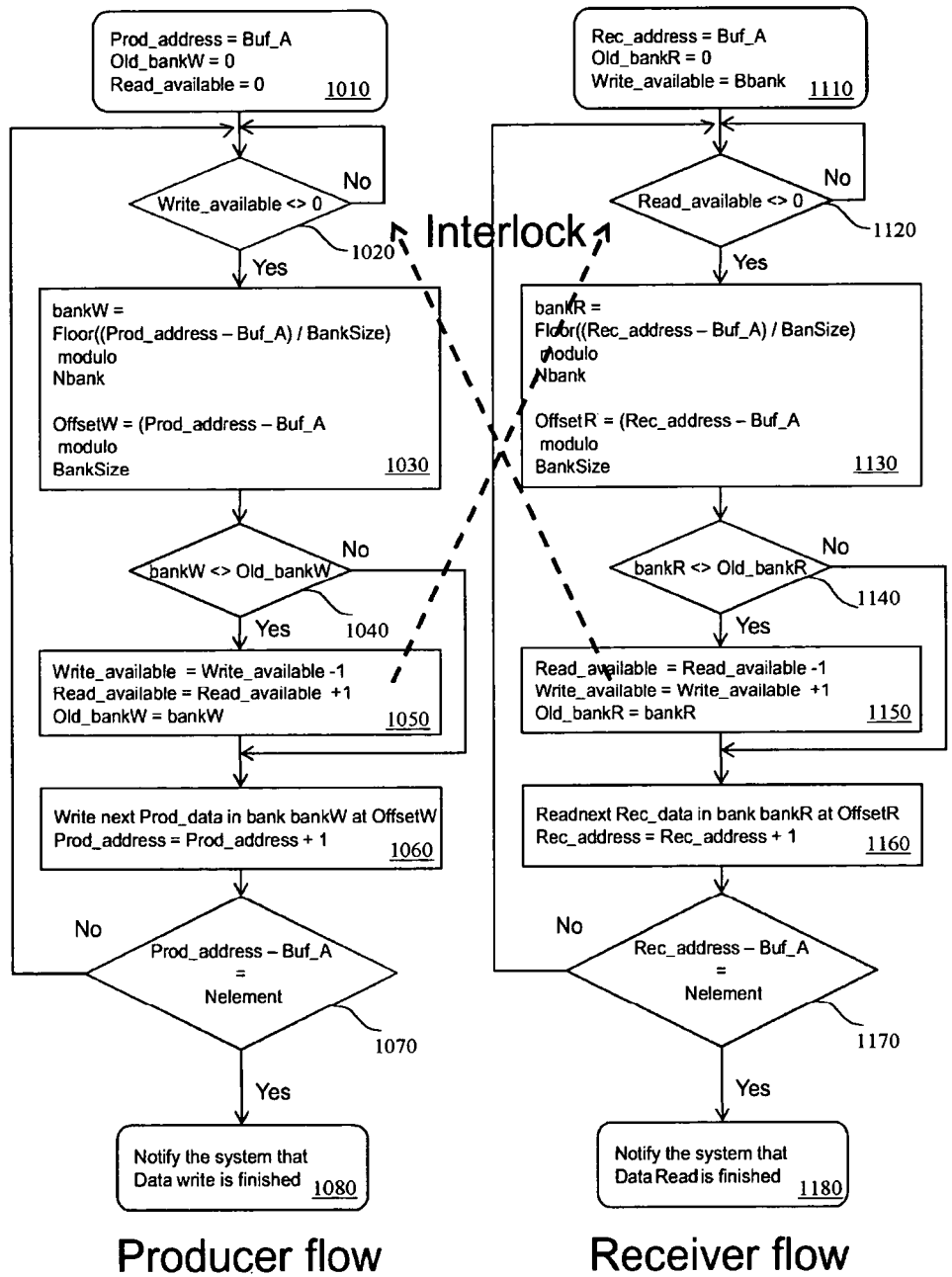
FIG. 8 shows the internal state machine process used by both the producer and consumer of the data object.
Figure 9:
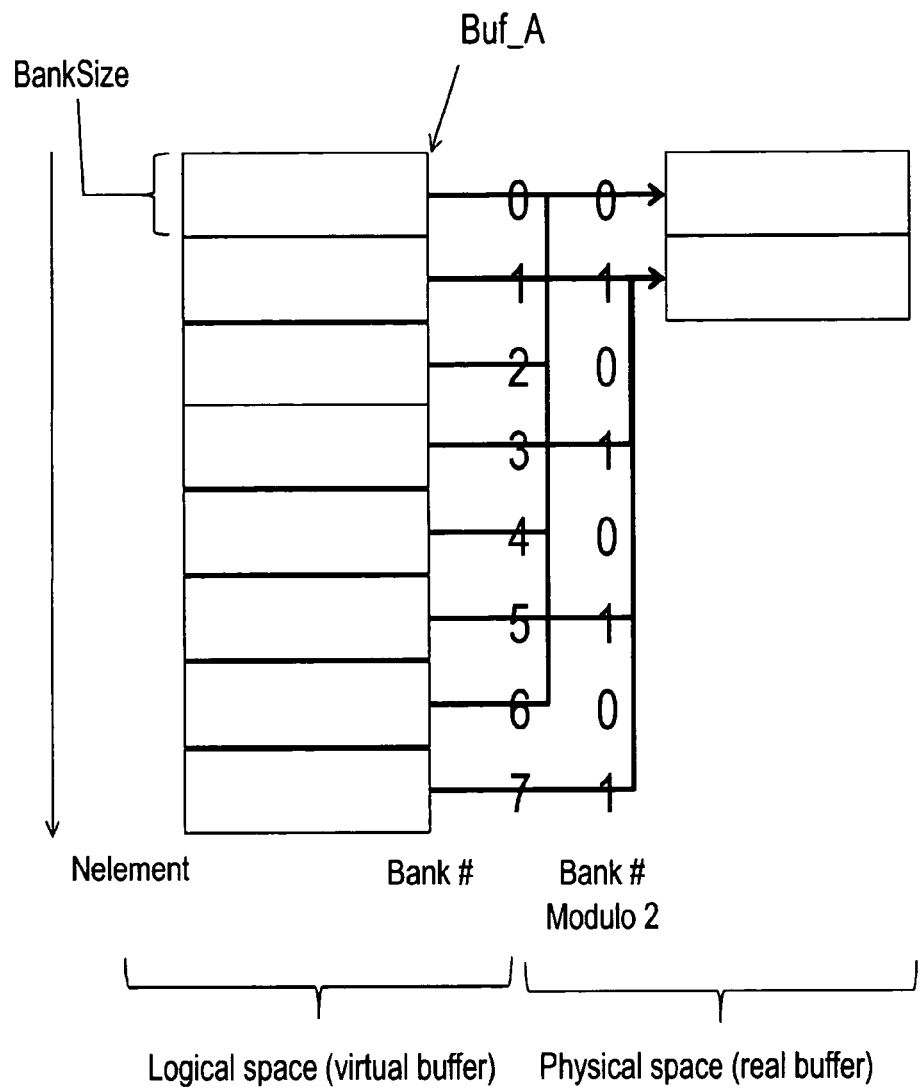
FIG. 9 illustrates a mapping example of an object in two different banks.
Figure 10:
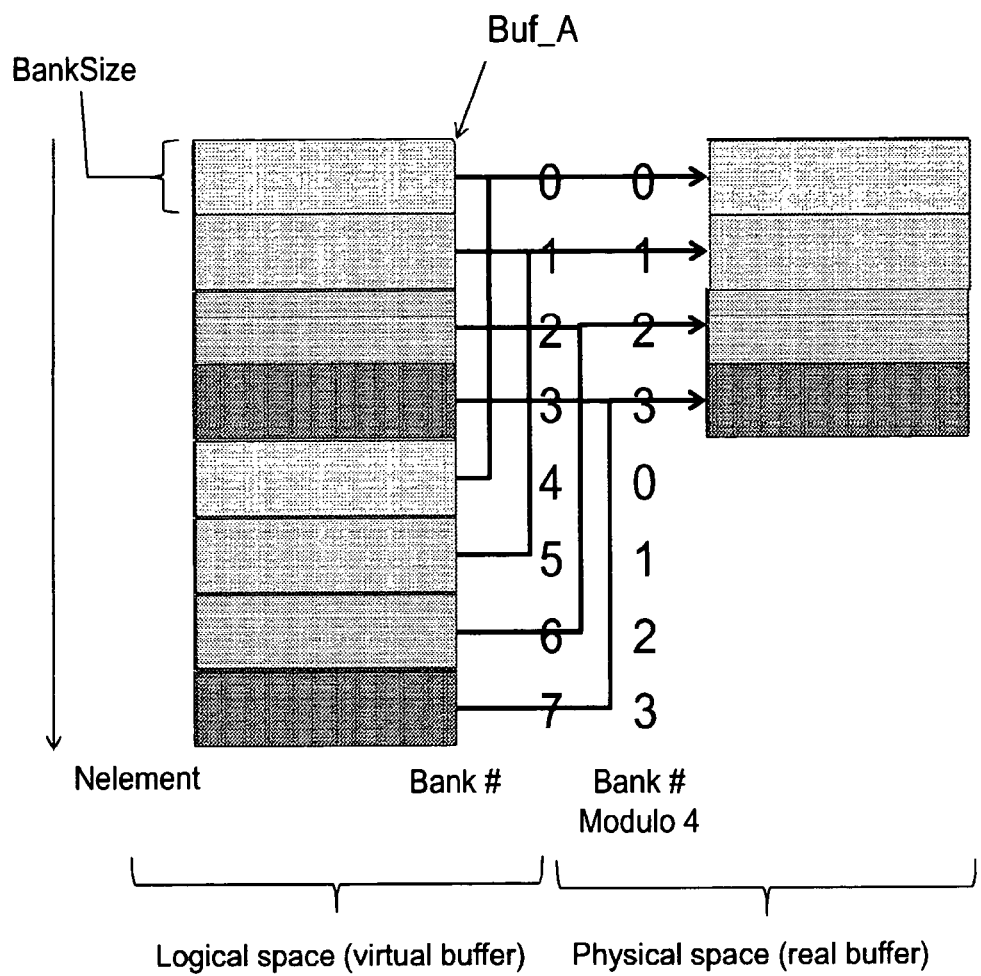
FIG. 10 illustrates a second mapping example of one object in four distinctive banks.

With respect to FIG. 8, there is now described the interlock mechanism between the write and read processes of the two banks. While only two particular banks A and B are described in this process, it should be clear that a skilled man will straightforwardly adapt the mechanism to the use of three or more banks.

The process is based on the following global and intermediate variables.

The global variables are the following:
Buf_A: is the address of the buffer within the unified memory
BankSize: the size of the bank
N bank: Ie number of banks (equal to 2 in the illustrate embodiment of FIG. 8)
Nelement: corresponds to the number of words composing the data object The intermediate variables are the following:
Read_available: the number of banks which are available for reading;
Write_available; the number of banks which are available for writing;
Old_bankW the bank which was previously written;
Old_bankR: the bank which was previously read;
Prod_address: the current address within the unified memory;
Rec_address: the current read address within the unified memory;
BankW: identifies the bank where a write operation is to be done;
BankR: identifies the bank where a read operation is to be done;
OffsetW: identifies the current position within the bank for the write process
OffsetR: identifies the current position within the bank for the read process The write process of the banks is based on the following steps:
Step 1010:
Prod_address=BufA
Old_bankW=0
Read_available=0
Step 1020:
If Write_available< >0 then go to step 1030. Otherwise remain to step 1020.
Step 1030
bankW=Floor((Prod_address−Buf_A)/BankSize) modulo Nbank
OffsetW=(Prod_address−BufA) modulo BankSize
Step 1040
If bankW < > Old bankW then go to 1050, otherwise go to 1060
  Step 1050
Write available=Write_available−1
Read available=Read_available+1
Old_bankW=bankW
Step 1060
Write next Prod_data in bank bankW at OffsetW
Prod_address=Prod_address+1
Step 1070
If Prod_address−BufA=Nelement, then go to step 1080, otherwise go to step 1020
Step 1080
Notify the system CPU that Data write is finished It can be seen that step 1010 corresponds to the initialization of the variables Prod_address, Old_bankW and Read_available, respectively to the values BufA, 0 and 0.

Step 1020 is a test for checking whether one bank is available for writing.

Step 1030 corresponds to the computation of the identifier of the bank to write (bankW) and the particular location (OffsetW) where the current word is to be stored.

Step 1040 is a test for determining whether a change of bank has occurred.

Step 1050 corresponds to the decrementation of parameter Write_available (since one bank has been written) and the incrementation of parameter Read_available. Parameter Old_bankW is updated with the current value of BankW.

Step 1060: defines the writing of the current word (Prod_data) of the data object data in the appropriate location (OffsetW) of the appropriate bank (bankW).

Step 1070 is a test for determining whether all the words composing the data object to be written have be processed and step 1080 completes the writing process.

Similarly, the read process of the banks is based on the following steps:

Step 1110:
Rec_address=BufA
Old_bankR=0
Write_available=Bbank
Step 1120:
If Read_available< >0 then go to step 1130. Otherwise remain to step 1120.
Step 1130
bankR=Floor((Rec_address−Buf_A)/BankSize) modulo Nbank
OffsetR=(Rec_address−BufA) modulo BankSize
Step 1140
If bankR <> Old bankR then go to 1150, otherwise go to 1160
Step 1150
Read_available=Read_available−1
Write_available=Write_available+1
Old_bankR=bankR
Step 1160
Read next Rec_data in bank bankR at OffsetR
Rec_address=Rec_address+1
Step 1170
If Rec_address−BufA=Nelement, then go to step 1180, otherwise go to step 1120
Step 1180
Notify the system that Data read is finished It can be seen that the two processes are mutually locked what ensures that there is no overwriting of data which would not have been read by the receiver and conversely, that the receiver would not read data which would not have been previously written.

In addition, the storage required for embodying bank A and bank B is significantly lower that the one which would have been required for storing the whole data object and, further, the "striping" of the data object is implicit to the CPU (and the software designer writing the source code for the program) which does not know the detail of that striping process.

Software development is thus greatly facilitated.

4) Application of the Invention

The process which was described here can be applied to graphic or video objects combination. It can nevertheless be extended to any operation where a producer and a consumer operate nearly synchronously on an intermediate object whose size is too large to be fitted at reasonable cost in an Integrated Circuit and whose manipulation create expensive memory footprint and memory bandwidth bottleneck. Another condition is the flow of data must be produced and consumed sequentially.

The invention claimed is:

1. A memory management process for optimizing access to a central memory located within a processing system comprising a set of specific units communicating with each other through said memory, said process comprising:
   a) arranging in a local memory at least a first and a second bank of storage (A, B) for temporary object exchange between a first data object producer and a second data object consumer;
   b) arranging an address translation process for mapping a real address of an object to be stored within said banks into an address of each bank;
   c) receiving one object produced by said producer and dividing it into stripes of reduced size;
   d) storing a first stripe into said first bank;
   e) storing a next stripe into said second bank while a preceding stripe is read by said object consumer;
   f) storing a further next stripe into said first bank again while the preceding stripe is read by said object consumer;
   g) repeating f) and d) until all stripes composing said data objects have been processed; and
   h) arranging an interlocking mechanism for locking a writing and a reading process in said banks to ensure said producer has enough space to forward further data and said receiver has data to read.

2. The memory management process according to claim 1 wherein a bus matrix structure is arranged between said producer and said consumer, and between said at least first and second bank, said bus matrix structure being arranged for performing an address translation process transparent to a central processor.

3. The memory management process according to claim 1 further comprising at least one monitoring circuit and a control unit wherein said at least one monitoring circuit is associated with at least one of said banks, said at least one monitoring circuit monitoring the address, the type of command and the identification of the producer/consumer and being capable of issuing an interrupt to said control unit independently of said central processor.

4. The memory management process according to claim 1 wherein said process is applied to a graphic process and a display engine.

5. The memory management process according to claim 1 wherein said process is used in a mobile telephone.

6. A digital processing system comprising a central processor arranged with a central memory and a set of specific units communicating with each other through said memory, said system further comprising:
   a) a local memory comprising at least a first and a second bank of storage (A, B) for a temporary object exchange between a first unit, said first unit being a first data object producer and a second unit, said second unit being a second data object consumer;
   b) a bus matrix structure arranged for providing access of said producer/consumer to said at least first and second banks, said bus matrix structure performing an address translation process for mapping a real address of an object to be stored within said banks into an address of the bank;
   c) monitoring circuits associated with each of said first and second banks of storage for monitoring an address, a type of command and an identifier of units accessing each said associated bank, said monitoring circuits being configured to issue an interrupt to a control unit independently of said central processor; and d) said bus matrix structure being further arranged for receiving an object produced by said producer and dividing it into stripes of reduced size and for alternatively performing a writing operation in said at least first bank while the second bank is being read, said bus matrix structure being under the control of said control unit handling said interrupts generated by said monitoring circuits.

7. The memory management process according to claim 6 wherein said system is applied to a graphic process and a display engine.

8. The memory management process according to claim 6 wherein said system is used in a mobile telephone.

* * * * *